United States Patent

[11] 3,539,195

| [72] | Inventors | Albert S. Swanson;<br>Joseph G. Kasper, Minneapolis, Minnesota |
|---|---|---|
| [21] | Appl. No. | 717,575 |
| [22] | Filed | April 1, 1968 |
| [45] | Patented | Nov. 10, 1970 |
| [73] | Assignee | Tennant Company<br>Minneapolis, Minnesota<br>a corporation of Minnesota |

[54] STEERING MECHANISM
2 Claims, 4 Drawing Figs.

[52] U.S. Cl. ..................................................... 280/92,
180/26
[51] Int. Cl. ...................................................... B62d 9/00
[50] Field of Search............................................ 180/26, 13,
52, 66; 280/91, 87, 92; 15/340

[56] References Cited
UNITED STATES PATENTS

| 1,833,844 | 11/1931 | Lusse ........................... | 180/26 |
| 2,306,042 | 12/1942 | Custer........................... | 180/26 |
| 2,789,648 | 4/1957 | Huffman ....................... | 180/26X |
| 2,972,159 | 2/1961 | Swanson et al. ............... | 15/340 |
| 3,189,931 | 6/1965 | Peabody........................ | 15/340 |
| 3,197,798 | 8/1965 | Brown et al................... | 15/340X |

*Primary Examiner*—Kenneth H. Betts
*Attorney*—Dugger, Peterson, Johnson & Westman ABSTRACT: A steering mechanism for a three-wheeled vehicle wherein two wheels are mounted for rolling about a common axis and a single wheel of the three-wheeled vehicle is powered and also is used for steering. The vehicle is constructed so that the steerable wheel can be turned to position wherein the projection of the rolling axis of the steering wheel forming the turning radius intersects the axis between the two idler wheels at a point substantially coinciding with the intersection of the common axis of the two idler wheels and the longest diagonal of the machine to permit turning the vehicle in a minimum clearance situation.

Patented Nov. 10, 1970
3,539,195
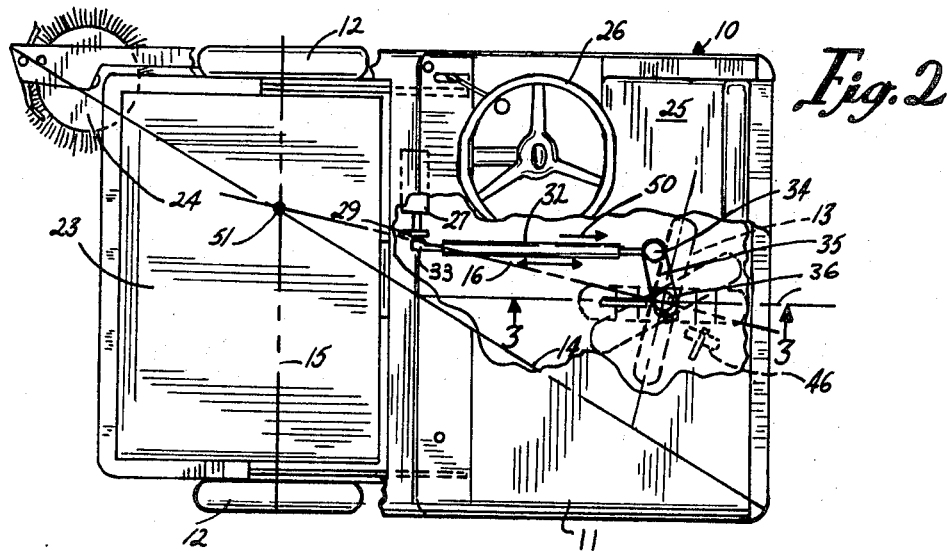
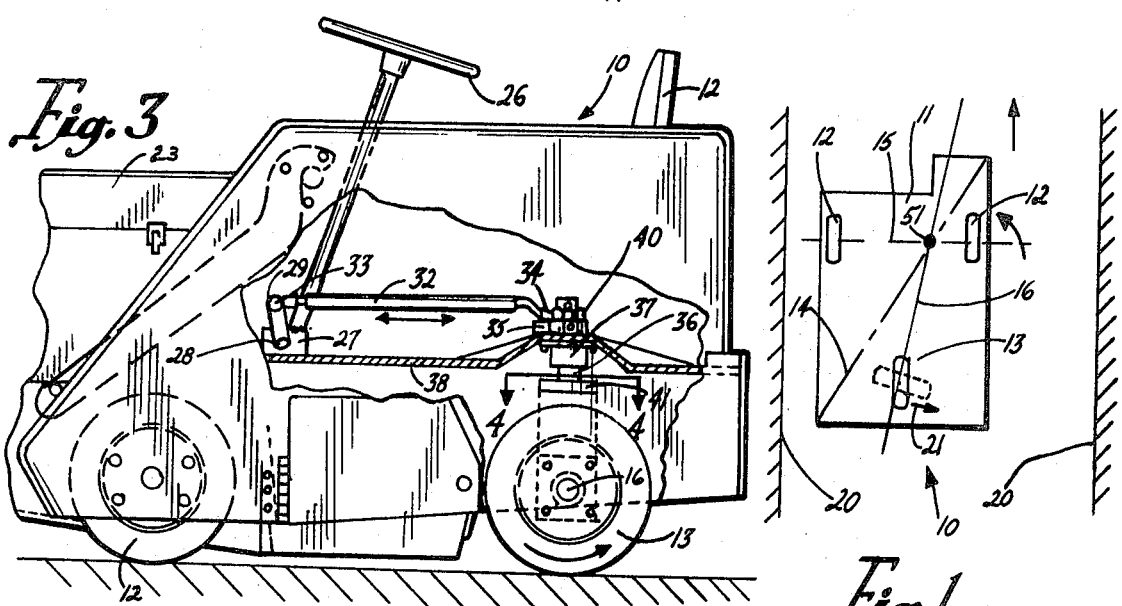
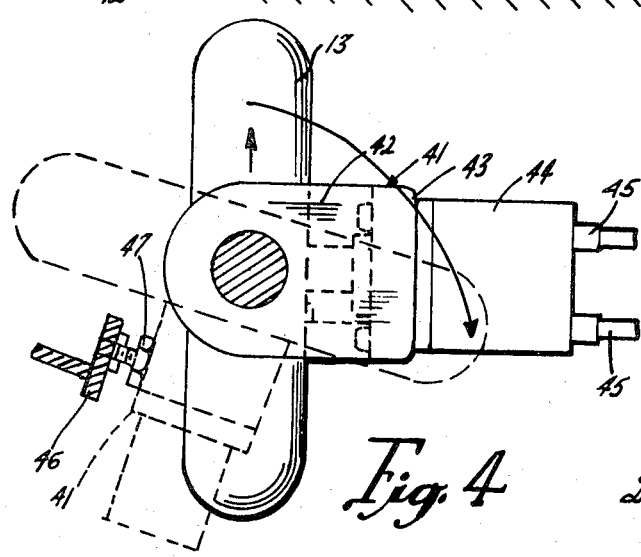
INVENTORS
ALBERT S. SWANSON
JOSEPH G. KASPER
BY
Dugger, Peterson, Johnson & Westman

STEERING MECHANISM

PRIOR ART

Three-wheeled vehicles using a steerable rear single wheel are used for sweeping machines, lift trucks and other vehicles that must operate in close corridors between stacked merchandise and the like. Turning radiuses have always been a problem with such vehicles, and generally, the machines required a substantial clearance on each side in order to turn around. This is due primarily to the lack of understanding of the principle necessary to make the turning area the minimum, and actually only equal to or slightly larger than the longest diagonal dimension of the machine to be turned.

SUMMARY OF THE INVENTION

The present invention relates to a three-wheeled vehicle having a steerable wheel at one end of the vehicle and two idler wheels mounted about a common axis and spaced apart adjacent the other end of the vehicle. The single steerable and driving wheel is mounted so that it can be turned about a vertical axis to position wherein a vertical plane passing through the rolling axis of the steering wheel and extending to the inside of the turn intersects the transverse rolling axis of the other two wheels substantially where this transverse rolling axis intersects the longest diagonal of the machine. Stated another way, the wheel that pivots to control steering in a three-wheeled vehicle is capable of being steered to position where the rolling axis extension of the steered wheel forming the turn radius of the vehicle will cross the axis of the two idler wheels of a three-wheeled vehicle on or to the outside of the machine from the point of intersection between the longest diagonal of the machine and the axis of the two idler wheels.

BRIEF DESCRIPTION OF THE DRAWINGS

FIG. 1 is a schematic representation of a three-wheeled vehicle showing the steering principles of the present invention;

FIG. 2 is a top plan view of a vehicle embodying the steering mechanism of the present invention with parts in section and parts broken away;

FIG. 3 is a side elevational view of the device of FIG. 2 with parts in section and parts broken away; and FIG. 4 is a fragmentary sectional view taken as on line 4—4 in FIG. 3.

DESCRIPTION OF THE PREFERRED EMBODIMENT

Referring first to FIG. 1, a vehicle 10 is of the type having a frame comprising a body 11 rotatably mounting a pair of forward wheels 12,12 for free rotation (idler wheels), and having a center steerable and powered drive wheel 13 adjacent the rear portions thereof. As shown, the vehicle has a long diagonal line indicated at 14 across the corners of the machine. The wheels 12,12 have a common rolling axis 15. The intersection of these two lines, namely the long diagonal line 14 and the rolling axis 15 falls to the right of the center line or longitudinal axis of the machine when viewed in the direction of movement of the vehicle. The wheel 13 is positioned at the rear of the vehicle and the upright steering axis lies on the center line of the machine midway between wheels 12,12.

The steerable wheel 13 is rotatable about a vertical axis. The wheel 13 also has a rolling axis. When the wheel 13 is turned about its steering axis as shown in dotted lines in FIG. 1 to a point where extension of the rolling axis 16 of the wheel extending toward the center of the turn intercepts the intersection between lines 14 and 15, the vehicle can be turned around in a space just slightly wider than the length of diagonal 14. As shown herein this is a clockwise rotation of the wheel 13 about its vertical axis. Thus, if the distance between the walls 20 of a corridor shown schematically is equal to or perhaps an eighth of an inch or so greater than the diagonal line 14, the unit can be turned in this corridor. The concept is to bring the rolling axis 16 of the wheel 13 to a point so that a vertical plane passing through this rolling axis intersects the axis 15 between the idler wheels either on the intersection of diagonal line 14 and the axis 15, or to the outside of this intersection point. When the phrase "to the otuside" is used, it is used in the context that it is between the intersection of lines 14 and 15 and the side of the machine that is on the outside of the turn. The positioning of the wheel 13 in FIG. 1 is so that the vehicle will be turning in a counterclockwise direction or to the left. The wheel 13 is powered so that the wheel will be driving the vehicle in direction as indicated by the arrow 21.

Looking at a particular embodiment of the machine, the vehicle 10 is comprised as a sweeping machine, as shown, of the general type shown in U.S. Pat. No. 3,189,931. The idler wheels 12 are rotatably mounted on the frame section 11 and are spaced apart as shown. The axis 15 of the wheels 12 is a transverse axis. The machine carries a sweepings and dust receptacle 23 between the forward portions of the frame, and has a curb brush 24 adjacent the right-hand forward corner of the machine. The unit has a conventional internal combustion engine which drives hydraulic pumps and the like from which the propulsion of the machine is obtained. An operator seat 25 is positioned adjacent the right-hand side of the machine, and a steering wheel 26 is positioned so that the operator can use it to steer the vehicle. The steering wheel 26 is of the ordinary automotive type and drives a steering gear assembly 27. The steering gear assembly 27 has an output shaft 28 on which an actuating arm 29 is drivably mounted. Upon rotating the steering wheel 26 the arm 29 will move about its pivot and will drive a drag link 32 which is attached to the outer end of the arm 29 with a suitable ball joint 33 (tie rod ends are used). The link 32 in turn has a ball joint 34 at its outer end which is attached to an arm 35. The arm 35 in turn is clamped onto an upright shaft 36 that is mounted in a bearing housing 37 attached to the frame portion 38 of the vehicle. A nut 40 is used to adjust the shaft 36 in the bearings (the shaft is a steering shaft that is tapered for bearing adjustment).

The shaft 36 is fixedly attached to a wheel mounting bracket 41 which forms an inverted L-shape and has a horizontal section 42 and a vertical leg 43. The bracket is quite heavy and is used for mounting the steering control and drive wheel 13. In this form of the invention shown, the vertical leg 43 of the bracket 41 is used to mount a heavy-duty hydraulic motor 44. The motor 44 has an output shaft indicated at dotted lines in FIG. 4 and the output shaft directly drivably mounts a wheel hub used to mount the wheel 13. The wheel hub is drivably mounted onto the output shaft of the hydraulic motor and carries the wheel 13 so that the load is carried by the motor shaft and upon rotation of the motor shaft the wheel 13 will also rotate. The rolling axis 16 of the wheel 13 is thus concentric with the axis of the shaft of hydraulic motor 44. The hydraulic motor 44 has hoses 45 leading to a suitable valve and pump system so that fluid under pressure can be directed to the motor 44 for forward and rearward propulsion of the wheel 13 and thus the vehicle 10.

A bracket 46 is fixedly mounted to a portion of the frame of the vehicle and mounts a stop bolt 47 that can be adjusted to provide a stop against the wheel mounting member 41 when it is in its full turning position. The stop is shown schematically and is provided on the underside of the frame 38 in any suitable manner, such as welding it to the frame in a position so that it will not interfere with movement of the tire on the wheel 13 but will stop the movement of the bracket 41 when it pivots in clockwise direction, which results in counterclockwise turning of the vehicle.

By turning the steering wheel 26, the link 32 will be moved in the desired direction. In order to accomplish the purposes of the invention, the turning here is toward the left of an operator on seat 25 and so upon rotation of the steering wheel 26 toward the left (counterclockwise) the link will move as indicated by the arrow 50 until the wheel 13 has rotated in clockwise direction to a point where the rolling axis 16 of the wheel 13 forming the turn radius lies on or is to the outside of the intersection point 51 between the diagonal lines 14 (see FIG. 2) and the axis 15 of the two front wheels 12. The turn radius of the three-wheeled machine is always an extension of axis 16 and the length of the turn radius is determined by the point of intersection of axes 16 and 15. When the center of the turn is on point 51 the vehicle can then be turned inside a space which is equal to or slightly greater than the diagonal line 14 of the vehicle. This is the longest diagonal of the vehicle shown.

In the present invention this means that the wheel has to rotate clockwise approximately 100° from its normal straight ahead position in clockwise direction. The normal steering in the opposite direction is only 50° and the wheel 13 also can rotate 50° in counterclockwise direction to obtain the normal steering action for turns in the other direction. The wheel 13 could be steered sufficiently far in both directions of turning to accomplish the present results. However, most standard automotive steering gears do not have sufficient travel to permit adequate rotation of wheel 13 in both directions. Thus, by providing optimum steering capabilities in one direction the invention has achieved its purposes.

An advantage of having the turning to the left or in counter-clockwise direction in the machine shown is that the operator sits on the right side of the machine in seat 25 and can watch the back corners of the machine so that striking the machine against one of the walls 20 can be avoided. If the rolling axis 16 of wheel 13 forming the turn radius crosses the axis 15 on or to the outside of the intersection point 51, the operator sitting on the seat 25 can guide the machine around merely by making sure that the rear corners of the machine do not strike the wall during the turning movement. He can closely observe this, and knows that the vehicle has the ability to clear or turn in a space no greater than or equal to the diagonal line 14. Thus, by providing the capability of turning the steerable and driving wheel to or past this point 51 a turn about point 51 can be made. Of course, one of the idler wheels 12 will back up during the turn as the axis of rotation will at point 51.

The arm 35 is positioned to provide for adequate clearance on the machine itself. The use of the stop member can be made so that the bracket 41 will stop with wheel 13 in the proper steering position. When this is done, the operator can then properly position the vehicle between the walls 20,20, turn the wheel 26 until the stop is hit and know that the vehicle will turn within a minimum space.

Corridors in warehouses or factories can then be reduced to a minimum as fork lifts or sweeping machines can easily be turned in the smallest possible space.

The embodiment shown and described deals with a rear steering wheel, the single steering wheel can also be to the front of the machine. The principle of steering will still apply. The rolling axis of the steerable wheel intersects the point of intersection between the axis of the other two wheels and the longest diagonal line of the machine.

We claim:

1. A selfpropelled vehicle having a frame comprising outer members shaped to have a maximum-length diagonal line from a forward corner to a rearward corner at the opposite side of the machine, a pair of spaced-apart first wheels rotatably mounted on said frame about a common transverse axis adjacent one end of the vehicle, a single steerable wheel positioned on the frame for movement about a vertical axis adjacent the other end of the vehicle and having a horizontal rolling axis, steering means to rotate said single wheel about its vertical axis, said maximum-length diagonal line intersecting the common axis of the first wheels at a point, said steering means permitting movement of said single wheel about its vertical axis to a turned position wherein the rolling axis of said single wheel intersects the axis of said first wheels substantially at the point of intersection between the axis of said first wheels and said maximum-length diagonal line, and stop means on said frame, said stop means being positioned to stop movement of said single wheel about its vertical axis in at least one direction of rotation with the projection of the rolling axis of said single wheel forming the turn radius of the vehicle substantially intersecting the intersection point between the maximum-length diagonal line of the machine and the axis of the first wheels.

2. The combination as specified in claim 1 wherein said vehicle has an operator seat and platform thereon, said operator seat and platform being adjacent one side of the vehicle, and wherein said means to rotate said single wheel about its vertical axis to its turn position rotates the single wheel in direction to position the operator seat toward the outside of the turning circle of the vehicle.